(12) United States Patent
Wang et al.

(10) Patent No.: US 12,095,668 B2
(45) Date of Patent: *Sep. 17, 2024

(54) DETERMINING WHETHER TO RATE LIMIT TRAFFIC

(71) Applicant: VMware LLC, Palo Alto, CA (US)

(72) Inventors: Dexiang Wang, Sunnyvale, CA (US); Yong Wang, San Jose, CA (US); Jerome Catrouillet, Palo Alto, CA (US); Sreeram Kumar Ravinoothala, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/088,562

(22) Filed: Dec. 24, 2022

(65) Prior Publication Data

US 2023/0130529 A1   Apr. 27, 2023

Related U.S. Application Data

(63) Continuation of application No. 17/008,576, filed on Aug. 31, 2020, now Pat. No. 11,539,633.

(51) Int. Cl.
  *H04L 47/2466* (2022.01)
  *H04L 9/40* (2022.01)
  (Continued)

(52) U.S. Cl.
  CPC .......... *H04L 47/2466* (2013.01); *H04L 12/66* (2013.01); *H04L 61/5007* (2022.05);
  (Continued)

(58) Field of Classification Search
  CPC ... H04L 12/66; H04L 2101/686; H04L 47/20; H04L 47/22; H04L 47/2466;
  (Continued)

(56) References Cited

U.S. PATENT DOCUMENTS

| 7,516,487 B1 | 4/2009 | Szeto et al. |
| 7,734,895 B1 | 6/2010 | Agarwal et al. |

(Continued)

FOREIGN PATENT DOCUMENTS

| CN | 106059960 A | 10/2016 | |
| CN | 109547502 A | 3/2019 | |
| EP | 3643052 B1 * | 7/2022 | ............. G06F 9/455 |

OTHER PUBLICATIONS

Non-Published Commonly Owned U.S. Appl. No. 17/971,591, filed Oct. 22, 2022, 45 pages, VMware, Inc.

(Continued)

*Primary Examiner* — Shah M Rahman
(74) *Attorney, Agent, or Firm* — Quarles & Brady LLP

(57) ABSTRACT

Some embodiments provide a method for a gateway datapath that executes on a gateway device to implement logical routers for a set of logical networks and process traffic between the logical networks and an external network. The method receives a data message at the gateway device. To process the data message, the method executes a set of processing stages that includes a processing stage for a particular logical router. As part of the processing stage for the particular logical router, the method (i) uses an access control list (ACL) table to determine whether the data message is subject to rate limiting controls defined for the particular logical router and (ii) only when the data message is subject to rate limiting controls, determines whether to allow the data message according to a rate limiting mechanism for the particular logical router.

20 Claims, 7 Drawing Sheets

| ** | 46 | ** | ** | ** | ** | ** | 0100000 | Don't Rate Limit |
|---|---|---|---|---|---|---|---|---|
| ** | 0 | TCP | IP_A | IP_B | ** | 179 | 0111101 | Don't Rate Limit |
| 2 | 20 | UDP | IP_C | IP_D | ** | ** | 1111100 | Rate Limit |
| ** | ** | ** | IP_A | IP_B | ** | ** | 0101100 | Rate Limit |

800

(51) Int. Cl.
*H04L 12/66* (2006.01)
*H04L 61/5007* (2022.01)
*H04L 69/22* (2022.01)
*H04L 69/326* (2022.01)
*H04L 101/686* (2022.01)

(52) U.S. Cl.
CPC ............ *H04L 63/101* (2013.01); *H04L 63/20* (2013.01); *H04L 69/22* (2013.01); *H04L 69/326* (2013.01); *H04L 2101/686* (2022.05)

(58) Field of Classification Search
CPC ... H04L 61/5007; H04L 63/101; H04L 63/20; H04L 67/2885; H04L 67/563; H04L 67/61; H04L 69/22; H04L 69/326
See application file for complete search history.

(56) References Cited

U.S. PATENT DOCUMENTS

| | | |
|---|---|---|
| 8,509,068 B2 | 8/2013 | Begall et al. |
| 9,378,049 B1 | 6/2016 | Johnson |
| 9,942,144 B1 | 4/2018 | Ramalingam et al. |
| 10,382,329 B1* | 8/2019 | Thomas ................ H04L 61/103 |
| 10,778,721 B1 | 9/2020 | Holbrook et al. |
| 10,785,056 B1* | 9/2020 | Mathur ............... G06F 9/45558 |
| 10,833,992 B1 | 11/2020 | Dickinson |
| 10,880,121 B1 | 12/2020 | Nirmala et al. |
| 10,897,420 B1 | 1/2021 | Pianigiani et al. |
| 11,265,292 B1* | 3/2022 | Leviseur ............. H04L 63/0263 |
| 11,483,246 B2 | 10/2022 | Wang et al. |
| 11,539,633 B2 | 12/2022 | Wang et al. |
| 11,599,395 B2 | 3/2023 | Wang et al. |
| 2003/0081546 A1 | 5/2003 | Agrawal et al. |
| 2003/0172145 A1* | 9/2003 | Nguyen ................ H04L 12/185 709/223 |
| 2005/0066166 A1 | 3/2005 | Chin et al. |
| 2007/0253439 A1 | 11/2007 | Iny |
| 2008/0222730 A1 | 9/2008 | Ford et al. |
| 2009/0016336 A1 | 1/2009 | LaVigne et al. |
| 2009/0119750 A1 | 5/2009 | Sembugamoorthy et al. |
| 2009/0129271 A1 | 5/2009 | Ramankutty et al. |
| 2009/0161682 A1 | 6/2009 | Johnson et al. |
| 2009/0300759 A1 | 12/2009 | Wang et al. |
| 2010/0135287 A1 | 6/2010 | Hosain et al. |
| 2011/0176418 A1 | 7/2011 | Gershinsky et al. |
| 2011/0219035 A1* | 9/2011 | Korsunsky ............ H04L 63/102 707/E17.005 |
| 2012/0051218 A1 | 3/2012 | Mohandoss et al. |
| 2012/0081580 A1 | 4/2012 | Côté et al. |
| 2013/0058229 A1 | 3/2013 | Casado et al. |
| 2013/0125120 A1 | 5/2013 | Zhang et al. |
| 2013/0185436 A1 | 7/2013 | Carlin et al. |
| 2014/0052877 A1 | 2/2014 | Mao |
| 2014/0153422 A1 | 6/2014 | Nambiar et al. |
| 2014/0156720 A1 | 6/2014 | Janakiraman et al. |
| 2015/0016286 A1 | 1/2015 | Ganichev et al. |
| 2015/0016469 A1 | 1/2015 | Ganichev et al. |
| 2015/0113133 A1 | 4/2015 | Srinivas et al. |
| 2015/0124651 A1* | 5/2015 | Zhang ................ G06F 9/45558 370/254 |
| 2015/0244630 A1 | 8/2015 | Madem et al. |
| 2015/0256466 A1 | 9/2015 | Roitshtein et al. |
| 2015/0263899 A1 | 9/2015 | Tubaltsev et al. |
| 2015/0271303 A1 | 9/2015 | Neginhal et al. |
| 2015/0281277 A1 | 10/2015 | May et al. |
| 2016/0014634 A1 | 1/2016 | Liu et al. |
| 2016/0057166 A1 | 2/2016 | Chesla |
| 2016/0080211 A1 | 3/2016 | Anand et al. |
| 2016/0105333 A1 | 4/2016 | Lenglet et al. |
| 2016/0164910 A1 | 6/2016 | Tang |
| 2016/0182255 A1 | 6/2016 | Liu et al. |
| 2016/0205071 A1* | 7/2016 | Cooper ............... H04L 12/6418 726/1 |
| 2016/0218918 A1 | 7/2016 | Chu et al. |
| 2017/0118042 A1 | 4/2017 | Bhattacharya et al. |
| 2017/0149648 A1 | 5/2017 | Yang et al. |
| 2017/0317954 A1 | 11/2017 | Masurekar et al. |
| 2018/0091547 A1 | 3/2018 | Pierre |
| 2018/0157515 A1 | 6/2018 | Malloy et al. |
| 2018/0176181 A1 | 6/2018 | Fu et al. |
| 2018/0262599 A1 | 9/2018 | Firestone |
| 2018/0279161 A1 | 9/2018 | Chen et al. |
| 2018/0285151 A1 | 10/2018 | Wang et al. |
| 2018/0309640 A1 | 10/2018 | Nagarajan et al. |
| 2018/0359134 A1 | 12/2018 | Pech et al. |
| 2019/0007330 A1 | 1/2019 | Browne et al. |
| 2019/0014051 A1 | 1/2019 | Briscoe et al. |
| 2019/0044809 A1 | 2/2019 | Willis et al. |
| 2019/0081899 A1 | 3/2019 | Mundkur et al. |
| 2019/0097973 A1* | 3/2019 | Adler .................. H04L 63/1425 |
| 2019/0108068 A1 | 4/2019 | Britkin et al. |
| 2019/0182367 A1 | 6/2019 | Kim et al. |
| 2019/0334868 A1 | 10/2019 | Tewari et al. |
| 2020/0278892 A1 | 9/2020 | Nainar et al. |
| 2020/0296139 A1* | 9/2020 | Fainberg ............... H04L 63/205 |
| 2020/0413283 A1 | 12/2020 | Shen et al. |
| 2021/0067489 A1 | 3/2021 | Jayawardena et al. |
| 2021/0119970 A1* | 4/2021 | Raphael ............... H04L 63/0263 |
| 2021/0176168 A1 | 6/2021 | Eckert et al. |
| 2021/0218677 A1 | 7/2021 | Wang et al. |
| 2021/0227424 A1 | 7/2021 | Wang et al. |
| 2021/0255903 A1 | 8/2021 | Wang et al. |
| 2021/0297451 A1* | 9/2021 | Raphael ............... H04L 41/0873 |
| 2021/0306354 A1* | 9/2021 | Raghuramu ........... G06N 20/00 |
| 2021/0399920 A1 | 12/2021 | Sundararajan et al. |
| 2021/0406255 A1* | 12/2021 | Raghuramu ........... G06N 20/00 |
| 2022/0070102 A1 | 3/2022 | Wang et al. |
| 2022/0158922 A1 | 5/2022 | Srivastava |
| 2022/0264360 A1 | 8/2022 | Chen et al. |
| 2022/0393983 A1 | 12/2022 | Wang et al. |
| 2023/0041869 A1 | 2/2023 | Wang et al. |
| 2023/0168947 A1 | 6/2023 | Wang et al. |

OTHER PUBLICATIONS

Seddiki, M. Said, et al., "FlowQoS: QoS for the Rest of US," HotSDN '14, Aug. 22, 2014, 2 pages, ACM, Chicago, IL, USA.

* cited by examiner

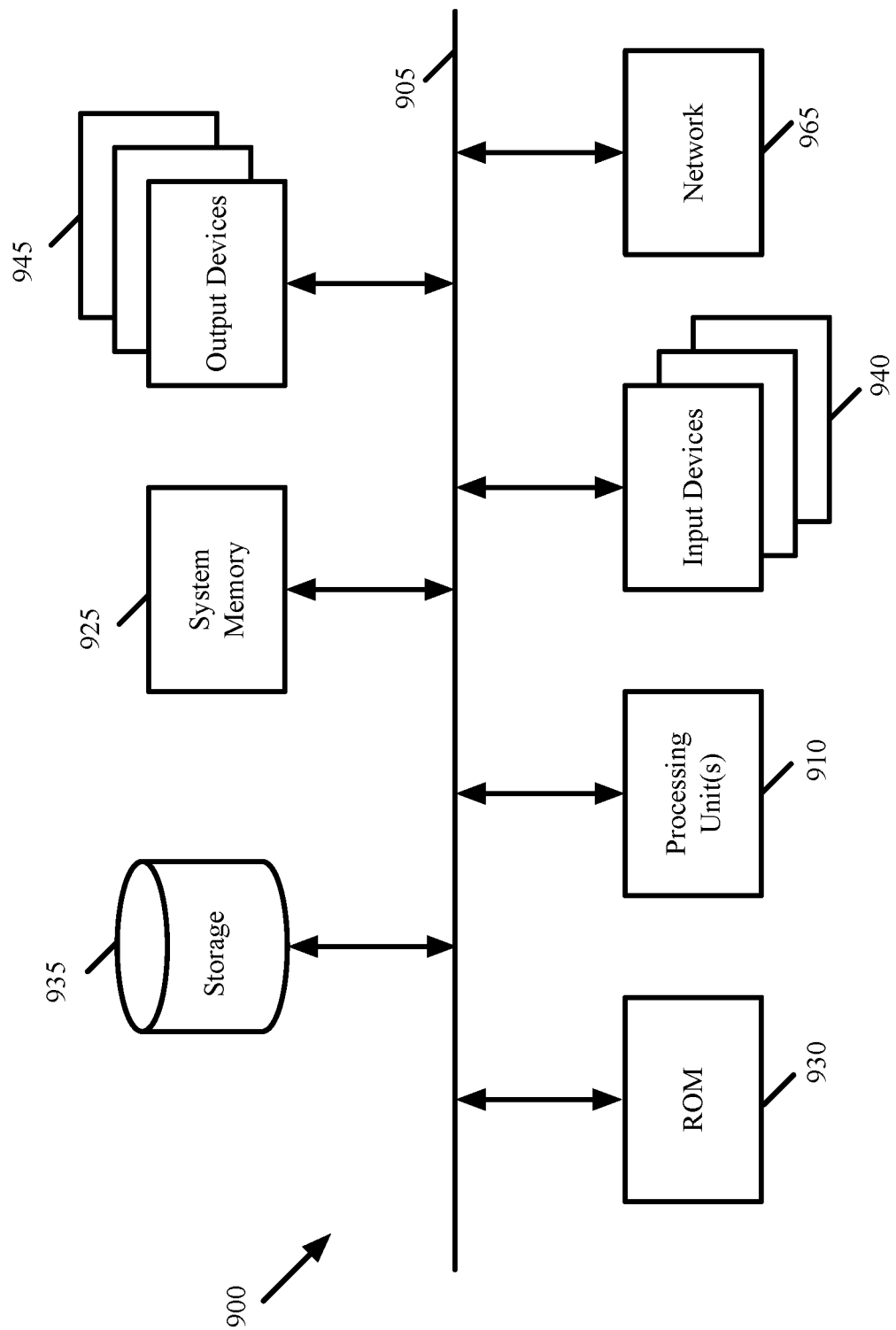

DETERMINING WHETHER TO RATE LIMIT TRAFFIC

CLAIM OF BENEFIT TO PRIOR APPLICATION

This application is a continuation application of U.S. patent application Ser. No. 17/008,576, filed Aug. 31, 2020, now published as U.S. Patent Publication 2022/0070102. U.S. patent application Ser. No. 17/008,576, now published as U.S. Patent Publication 2022/0070102, is incorporated herein by reference.

BACKGROUND

Quality of service (QoS) mechanisms are important in datacenters, in order to guarantee contracted-for levels of performance. However, rate-limiting mechanisms are generally performed in hardware (e.g., at the network interface controller (NIC) level), which aggregates all tenants of a datacenter together. Traffic is typically tenant-independent at the hardware level, and therefore difficult to disaggregate. In addition, not necessarily all traffic should be rate limited. For instance, control traffic typically should not be subject to rate limiting.

BRIEF SUMMARY

Some embodiments provide a gateway datapath, executing on a gateway device, that manages quality of service (QoS) for multiple different logical networks (e.g., for different tenant logical networks). The gateway datapath implements logical routers for the different logical networks to process traffic between the logical networks and an external network. In some embodiments, upon receiving a data message (either from the external network or from one of the logical networks), the gateway datapath executes a set of processing stages to process (e.g., forward, drop, etc.) the data message. This set of processing stages may include multiple stages corresponding to different logical forwarding elements (such as logical switches and logical routers), including a stage for a specific logical router of the logical network with which the data message is associated. As part of the processing for the logical router, the gateway datapath (i) uses a table (e.g., an access control list (ACL) table) to determine whether the data message is subject to rate limiting controls defined for the logical router, and only if the data message is subject to such rate limiting controls, (ii) determines whether to allow the data message according to a rate limiting mechanism for the logical router.

In some embodiments, the logical router is associated with a particular tenant (e.g., the logical router is an ingress/egress point for the tenant logical network). In some such embodiments, the gateway datapath implements logical routers for numerous different tenant logical networks, and the gateway device stores ACL tables for at least a subset of these logical routers. This allows each tenant to configure specific rate limiting (e.g., quality of service (QoS)) policy for ingress and/or egress traffic. In some embodiments, each ACL table is a set of rules that each match on a set of header fields and specify (for data messages matching the rule) whether to perform rate limiting. In case a particular data message matches multiple rules in a single ACL table, the rules are ordered based on priority so that only the highest priority matched rule will be followed. The tenant network administrator can specify in some embodiments how to treat data messages that do not match any of the rules (e.g., always apply the rate limiting mechanism or never apply the rate limiting mechanism).

Rather than store a single ACL table for each logical router, some embodiments store multiple ACL tables. For instance, some embodiments use separate tables for ingress data messages and egress data messages to ensure that ingress data messages don't accidentally match rules meant for egress and vice versa. In addition, some embodiments use a fixed length data structure generated from data message header fields (as explained further below) for matching against the ACL table rules. Because different protocols may have different length header fields (e.g., IPv4 addresses compared to IPv6 addresses), some embodiments use different ACL tables for these different protocols. Thus, for example, a gateway device might store four ACL tables for a specific logical router (IPv4 ingress, IPv4 egress, IPv6 ingress, IPv6 egress).

As mentioned, to perform a lookup in the ACL table to determine whether to apply a rate limiting mechanism to a data message, some embodiments extract a particular set of header field values from the data message and match this (fixed-length) particular set of header field values against the rules. For instance, some embodiments use the transport layer protocol field (of the network layer header), source and destination network layer addresses (e.g., IPv4 or IPv6 addresses), source and destination transport layer ports, a type of service (ToS) value or differentiated services code point (DSCP) value, and a class of service (CoS) value.

Along with the extracted header field values, some embodiments include a presence bit for each header field that indicates whether the field is actually present in the data message. Certain fields (e.g., the ToS, DSCP, and/or CoS fields) may not be present in some data messages. Because some embodiments require a fixed-length set of header field values for the table lookup, a value is filled in for the non-present header field and this default value should not accidentally lead to a match against a rule requiring a specific value for that field. The use of a presence bit for each of the fields ensures that such an accidental match will not happen.

It should be noted that, in some embodiments, the entire set of processing stages is typically only performed for the first data message of a data message flow. The gateway datapath generates a flow cache entry based on this processing, and subsequent data messages match the flow cache entry rather than requiring the more resource-intensive set of processing stages. To ensure that the ACL table does not need to be looked up for each subsequent data message in the data message flow, all of the fields on which the ACL table matches are also incorporated into the flow cache entry (including at least some of the presence bits, in some embodiments). While the lookups to determine whether subsequent data messages of a flow are subject to rate limiting controls are handled by the flow cache entry, the actual application of the rate limiting mechanism is applied separately for each data message. Thus, for instance, a first data message in a flow might be allowed, but a later data message in the same flow could be dropped due to congestion.

In some embodiments, this rate limiting mechanism involves the application of a set of QoS data structures for the particular logical router, which is described in greater detail in U.S. patent application Ser. No. 16/741,457, which is incorporated herein by reference. The gateway datapath compares a size of the data message that is subject to rate limiting to a current token bucket value stored for the logical router. If the data message is smaller than the current token bucket value, then the data message is allowed. Some embodiments also enable the network administrator to configure the gateway device to modify the DSCP value for allowed data messages (e.g., in order to indicate that the data message is a high priority data message). Similarly, if the data message is larger than the current token bucket value, then some embodiments either drop the data message or modify the DSCP value of the data message to indicate that the data message is a low priority data message.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 9 conceptually illustrates an electronic system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a gateway datapath, executing on a gateway device, that manages quality of service (QoS) for multiple different logical networks (e.g., for different tenant logical networks). The gateway datapath implements logical routers for the different logical networks to process traffic between the logical networks and an external network. In some embodiments, upon receiving a data message (either from the external network or from one of the logical networks), the gateway datapath executes a set of processing stages to process (e.g., forward, drop, etc.) the data message. This set of processing stages may include multiple stages corresponding to different logical forwarding elements (such as logical switches and logical routers), including a stage for a specific logical router of the logical network with which the data message is associated. As part of the processing for the logical router, the gateway datapath (i) uses a table (e.g., an access control list (ACL) table) to determine whether the data message is subject to rate limiting controls defined for the logical router, and only if the data message is subject to such rate limiting controls, (ii) determines whether to allow the data message according to a rate limiting mechanism for the logical router.

Figure 1:
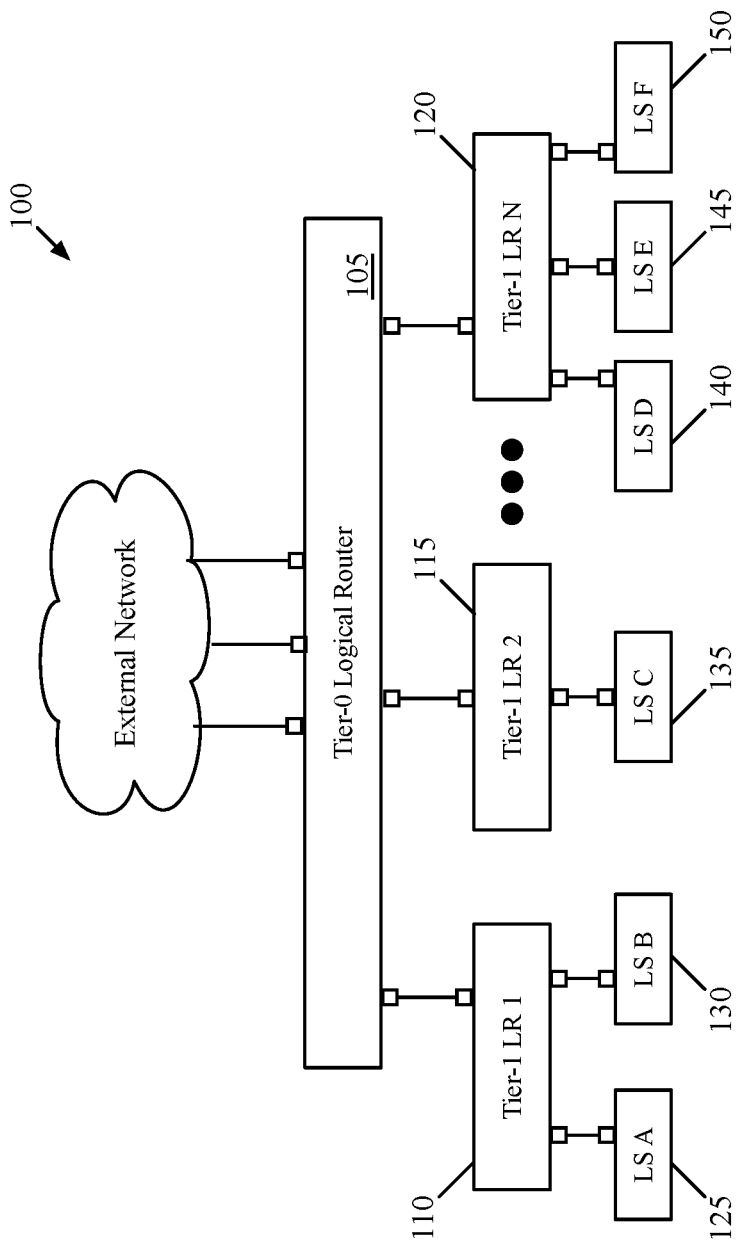
FIG. 1 conceptually illustrates a logical network architecture with multiple logical routers.

FIG. 1 conceptually illustrates a logical network architecture 100 with multiple logical routers. In some embodiments, a logical network is a conceptualization of a network (e.g., for a datacenter tenant) that is defined by a network administrator. Such logical networks may include logical forwarding elements (e.g., logical routers, logical switches) as well as various other logical network entities (e.g., firewalls, load balancers, etc.). In the physical network (e.g., a datacenter network), these logical networks are implemented by various physical forwarding elements (e.g., software forwarding elements such as virtual switches, hardware forwarding elements such as top-of-rack switches, etc.), such that data messages sent by logical network endpoints (e.g., virtual machines, containers, or other data compute nodes) are processed as though sent through a physical network with the structure of the logical network. This formulation allows for many logical networks to be implemented (e.g., as overlay networks) by the physical network elements. That is, a single software switch, software router, gateway datapath, etc. might implement many logical networks for many different tenants.

As shown, the logical network architecture 100 includes a tier-0 (T0) logical router 105 that provides access to external networks. In addition, multiple tier-1 (T1) logical routers 110-120 connect to the T0 logical router 105, and logical switches 125-150 each connect to one of these T1 logical routers 110-120. In addition, various logical network endpoints such as virtual machines (VMs), containers, physical computing devices, or other data compute nodes (DCNs) may be attached to the logical switches.

In some embodiments, each T1 logical router is configured by a different datacenter tenant (e.g., via an application that only allows the tenant to manage their own logical network), while the T0 logical router is configured by a datacenter administrator (e.g., a cloud provider). Each of the tenants also configures the logical switches that connect to their respective T1 logical routers. In some embodiments, any number of T1 logical routers may be attached to a T0 logical router such as the T0 logical router 105. In other embodiments, one tenant or other entity may configure multiple T1 logical routers to connect to the same T0 logical router (which may be configured by the same entity or a different entity). Some datacenters may have only a single T0 logical router to which all T1 logical routers implemented in the datacenter attach, whereas other datacenters may have numerous T0 logical routers. For instance, a large datacenter may want to use different T0 logical router policies for different tenants, or may have too many different tenants to attach all of the T1 logical routers to a single T0 logical router. Part of the routing table for a T0 logical router includes routes for all of the logical switch domains of its connected T1 logical routers, so attaching numerous T1 logical routers to a T0 logical router creates several routes for the routing table of the T0 logical router just based on the subnets attached to each of the T1 logical routers.

A network control system of some embodiments (e.g., a set of network controller applications and/or network management applications) is responsible for receiving the logical network configurations from the administrators, generating configuration data for allowing the various physical network elements to implement the logical networks, and distributing this data to these physical network elements. In some embodiments, the network control system receives configuration data for a logical router from a network administrator and defines multiple routing components for the logical router. For instance, some embodiments define a distributed routing component (DR) and one or more centralized routing components (also referred to as service routers, service routing components, or SRs), each of which has a separate routing table and separate set of interfaces. In addition, the network control system defines transit logical switches for logically switching data messages between the routing components in some embodiments, as well as between the T1 logical routers and the T0 logical routers.

For instance, the network control system of some embodiments would receive configuration data for the T1 logical router 110 and generate a DR and two SRs (one active and one standby). In addition, the network control system would generate a first transit logical switch to connect these routing components with each other and a second transit logical switch to connect the T1 logical router 110 to the T0 logical router 105. Further discussion of the different routing components and transit logical switches can be found in U.S. Pat. No. 9,787,605, which is incorporated herein by reference.

The DRs and logical switches are implemented in a distributed manner in some embodiments. That is, a single DR or logical switch is implemented by many different physical forwarding elements. For instance, a virtual switch executing on a host computer that hosts a DCN connected to logical switch 125 might implement at least logical switches 125 and 130 as well as the DR for T1 logical router 110 (and the transit logical switch internal to the implementation of the T1 logical router).

Each SR, on the other hand, is implemented on a single physical computer in some embodiments. Such a physical computer might implement multiple SRs, as well as the various DRs and logical switches. For instance, some embodiments designate gateway devices for implementing the SRs of the TLRs, as well as the SRs of the PLRs. In some embodiments, these gateway devices implement a gateway datapath (e.g., using the data plane development kit (DPDK), a set of libraries and network interface controller (NIC) drivers for packet processing) that performs the data message processing for the SRs (as well as the distributed network entities of the logical networks).

Figure 2:
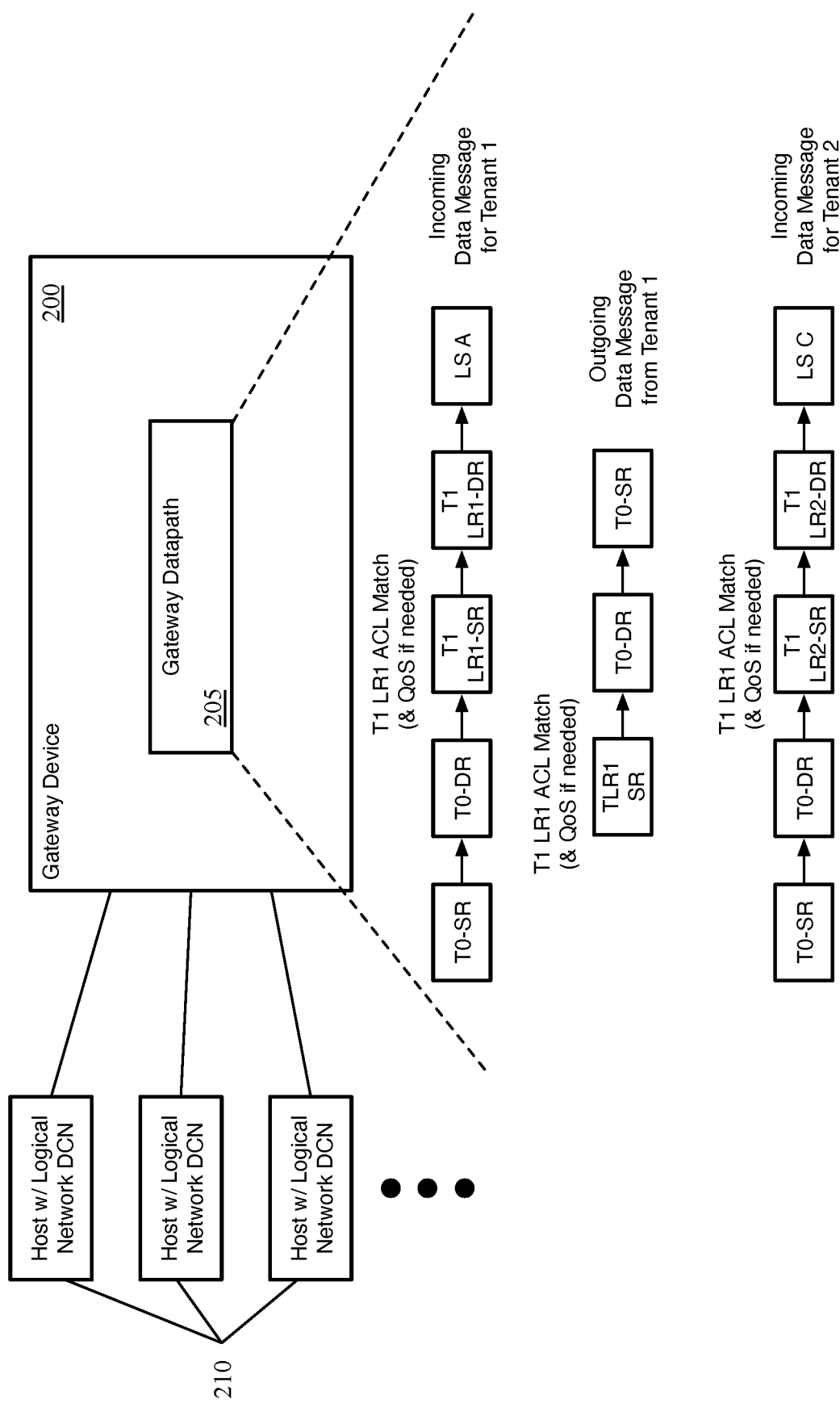
FIG. 2 conceptually illustrates a gateway device that executes a gateway datapath.

FIG. 2 conceptually illustrates such a gateway device 200 that executes a gateway datapath 205. The gateway datapath, in different embodiments, may execute in virtualization software of the gateway device 200 (e.g., if the gateway device is a host computer that also hosts various DCNs), as an application/daemon on a bare metal device, within a virtual machine, etc. As shown, various host computers 210 that host one or more logical network DCNs connect (through the physical network of the datacenter) to the gateway device 200. These logical network DCNs exchange data traffic with each other (which may not require processing by the gateway datapath 205) as well as with external endpoints.

Data traffic between the logical network DCNs and the external endpoints is transmitted through the gateway datapath 205 of the device 200. In some embodiments, at least for the first packet of a data flow in each direction, the gateway datapath executes a multi-stage processing pipeline. This processing pipeline is described in further detail in U.S. Pat. No. 10,084,726, which is incorporated herein by reference. At each stage, the gateway datapath 205 of some embodiments reads configuration data for the stage and performs processing according to that configuration data (e.g., to determine how to switch and/or route a data message, to perform load balancing and/or network address translation, etc.).

As described in U.S. Pat. Nos. 9,787,605 and 10,084,726, which are incorporated by reference above, the packet processing pipeline is different for ingress and egress packet processing pipelines in some embodiments, as the physical forwarding elements implementing the logical networks perform first-hop processing. For egress packets (originating at the logical network DCNs and directed outside the logical network), a software forwarding element executing on the host computer that hosts the source DCN is the first-hop forwarding element. This software forwarding element would perform logical processing for the initial logical switch and the DR of the T1 logical router, before determining (based on processing for the transit logical switch of the T1 logical router) that (i) the data message is to be sent to the SR of the T1 logical router and (ii) that this requires transmission through the physical datacenter network to the gateway device 200. As such, FIG. 2 illustrates that for an outgoing (egress) data message for tenant 1, the processing at the gateway datapath 205 begins with the SR of the T1 logical router 110. As part of this processing, the gateway datapath performs a lookup in an ACL table associated with the T1 logical router 110 to determine whether rate limiting controls apply to the data message (described in greater detail below) and, if rate limiting controls apply, also performs a QoS (rate limiting) operation. Assuming the data message is allowed (i.e., not dropped), the processing pipeline for this data message also includes stages for the DR and SR of the T0 logical router 105 (in addition to the transit logical switches between these routing components, which are not shown in the figure). In this description, the ACL lookup and rate limiting controls are applied at the T1 logical router level, but it should be understood that some embodiments also (or only) apply these operations at the T0 logical router.

For incoming messages, the gateway device 200 is the first-hop forwarding element, so the gateway datapath 205 performs more extensive logical processing. As shown, when the gateway datapath 205 receives a data message for tenant 1, the processing pipeline includes stages for the SR and DR of the T0 logical router 105 as well as the SR and DR of the T1 logical router 110 (in addition to the three transit logical switches between these various routing components), then the logical switch 125. As part of this processing for the SR of the T1 logical router, the gateway datapath performs a lookup in an ACL table associated with the T1 logical router 110 to determine whether rate limiting controls apply to the data message and, if rate limiting controls apply, also performs a QoS operation. A similar processing pipeline is executed by the gateway datapath 205 for incoming data messages for tenant 2, except that the T1 logical router and logical switch stages use configuration data for T1 logical router 115 and logical switch 135. In addition, as part of the processing for the SR of the T1 logical router, the gateway datapath performs a lookup in an ACL table associated with the T1 logical router 115 to determine whether rate limiting controls apply to the data message and, if rate limiting controls apply, also performs a QoS operation. In some embodiments, the gateway device stores multiple separate ACL tables for each logical router (e.g., separate tables for ingress and egress and/or for different protocols, such as IPv4 and IPv6).

It should be noted that in some other embodiments, there is no T0 logical router (i.e., the T1 logical routers connect directly to physical routers of the external network). In this case, the datapath uses other mechanisms (e.g., associating different T1 logical routers with different interfaces) to determine which T1 logical router configuration to use for processing incoming data messages. In yet other embodiments, the T0 logical router SR is implemented on a different gateway device. In this case, the T0 logical router DR processing stage is executed as part of the gateway datapath with the T1 logical router SR for egress data messages, but as part of the gateway datapath on the other device with the T0 logical router SR for ingress data messages. The use of different ACL tables for different logical routers is not dependent on whether or not a T0 logical router is part of the logical processing pipeline.

In addition, it should be noted that in some embodiments the T0 logical routers and T1 logical routers do not necessarily correspond to datacenter providers and tenants. In some embodiments, the T0 logical routers are a tier of logical routers that provide a direct connection to the external networks while the T1 logical routers are a tier of logical routers that are not allowed to directly connect to external networks, but which can provide services for data compute nodes that connect to sets of logical switches. In some such embodiments, the use of different ACL tables for determining whether to apply rate limiting controls for different logical routers is not dependent on whether or not these different logical routers actually correspond to different tenants.

The gateway device 200 of some embodiments includes a network interface controller (NIC) via which data messages are sent and received (e.g., a NIC connected to an external router), and a set of processing units such as one or more CPUs. Such a set of CPUs may have multiple cores for processing data messages, with data messages load balanced between the cores (e.g., using receive side scaling (RSS) or another load balancing technique). In some embodiments, the load balancing technique computes a hash value of various data message headers that are independent of the tenant logical router (e.g., both source and destination network addresses), such that data messages for one tenant logical network are distributed across all four of the cores as shown in the figure. Some such embodiments track the cores to which ingress data messages for various data flows are assigned, and assign egress data messages for corresponding data flows to the same core.

Figure 3:
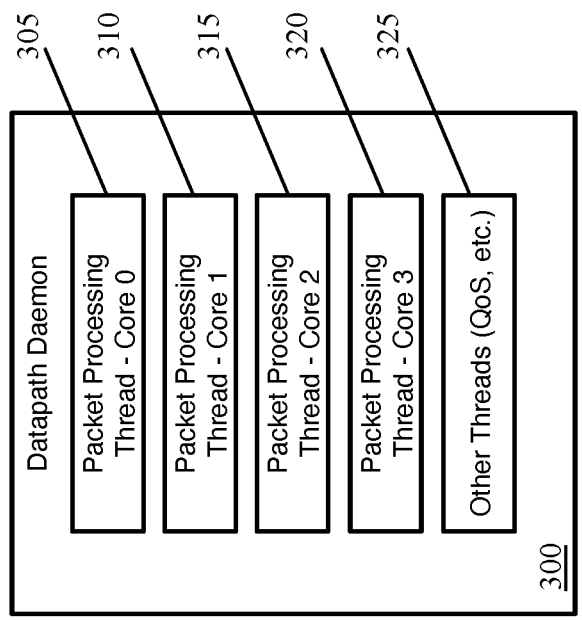
FIG. 3 conceptually illustrates the threads executed by a datapath daemon of some embodiments.

The gateway datapath, in some embodiments, executes multiple packet-processing threads, each of which executes on a different core of the CPU set of the gateway device. FIG. 3 conceptually illustrates the threads executed by a datapath daemon 300 of some embodiments. As mentioned, the gateway datapath is a daemon or other application that can execute in virtualization software of a host computer, on a bare-metal device, in a virtual machine, etc. This daemon 300 in some embodiments uses DPDK to provide accelerated data message processing using the NIC of the gateway device.

As shown in FIG. 3, the datapath daemon 300 executes one packet-processing thread 305-320 for each core of the CPU set that is assigned for packet processing. In some embodiments, these are run-to-completion threads that can process data messages simultaneously (i.e., each of the cores can simultaneously process a separate data message). In addition, the datapath daemon 300 executes other threads 325 (e.g., a QoS thread that handles QoS data structures for the various logical routers, as well as threads for other purposes such as BFD, MAC learning, etc.). In some embodiments, these other threads are scheduled among the cores of the CPU that are not assigned for packet processing.

As mentioned, the gateway device of some embodiments stores separate ACL tables (or other types of match tables) for each of at least a subset of the logical routers implemented by the gateway datapath. This allows each tenant (or other entity that configures the logical router) to configure specific rate limiting policy for ingress and/or egress traffic. In some embodiments, each ACL table is a set of rules that each match on a set of header fields and specify (for data messages matching the rule) whether to perform rate limiting. In case a particular data message matches multiple rules in a single ACL table, the rules are ordered based on priority so that only the highest priority matched rule will be followed. The network administrator can specify in some embodiments how to treat data messages that do not match any of the rules (e.g., always apply the rate limiting mechanism or never apply the rate limiting mechanism).

Figure 4:
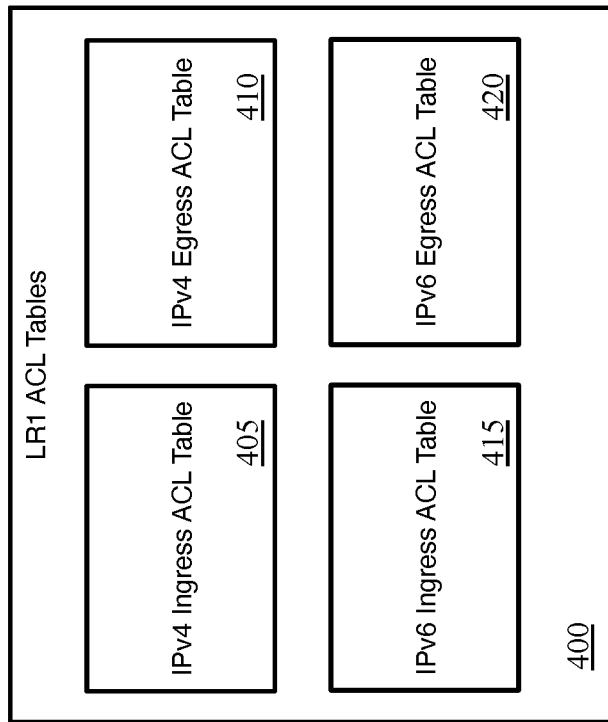
FIG. 4 conceptually illustrates ACL tables stored for a logical router of some embodiments.

Rather than store a single ACL table for each logical router, some embodiments store multiple ACL tables. FIG. 4 conceptually illustrates the ACL tables 400 stored for a logical router (LR1) of some embodiments. In this example, the ACL tables 400 include an IPv4 ingress ACL table 405, an IPv4 egress ACL table 410, an IPv6 ingress ACL table 415, and an IPv6 egress ACL table 420. Some embodiments use separate tables for ingress data messages and egress data messages (e.g., tables 405 and 410) to ensure that ingress data messages do not accidentally match rules meant for egress and vice versa. For example, the network administrator might want to treat data messages with a particular DSCP value differently on ingress and egress, and if only one ACL table was used then a match on just this DSCP value would not differentiate between ingress data messages and egress data messages.

In addition, some embodiments store (or instantiate in memory) multiple copies of each ACL table (e.g., multiple memory allocations), so that different threads executing on different cores can access different copies. Other embodiments store (or instantiate in memory) a single copy (e.g., a single memory allocation) for each ACL table. The ACL tables are instantiated in memory as a set of multi-bit tries in some embodiments. Some embodiments split the rules of a table into several non-intersecting subsets when possible and construct a separate trie for each of these subsets so as to reduce the required memory (at the cost of increasing the time required to find a match while processing a data message).

Figures 6, 7:
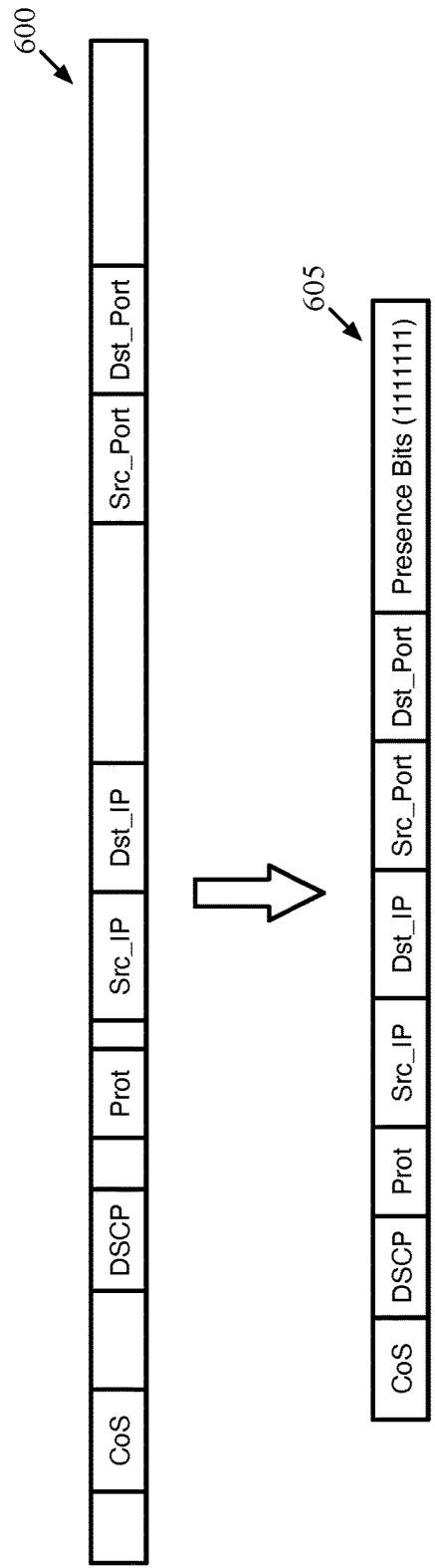
FIGS. 6 and 7 conceptually illustrate the extraction of sets of header values into ACL match keys from data messages.

Some embodiments use a fixed length data structure generated from data message header fields, as explained in greater detail below by reference to FIG. 6, for matching against the ACL table rules. Because different protocols may have different length header fields (e.g., IPv4 addresses compared to IPv6 addresses), some embodiments use different ACL tables for these different protocols (e.g., the ingress ACL tables 405 and 415). Thus, in this example, the gateway device stores four ACL tables 405-420 for a single logical router (IPv4 ingress, IPv4 egress, IPv6 ingress, IPv6 egress).

Figure 5:
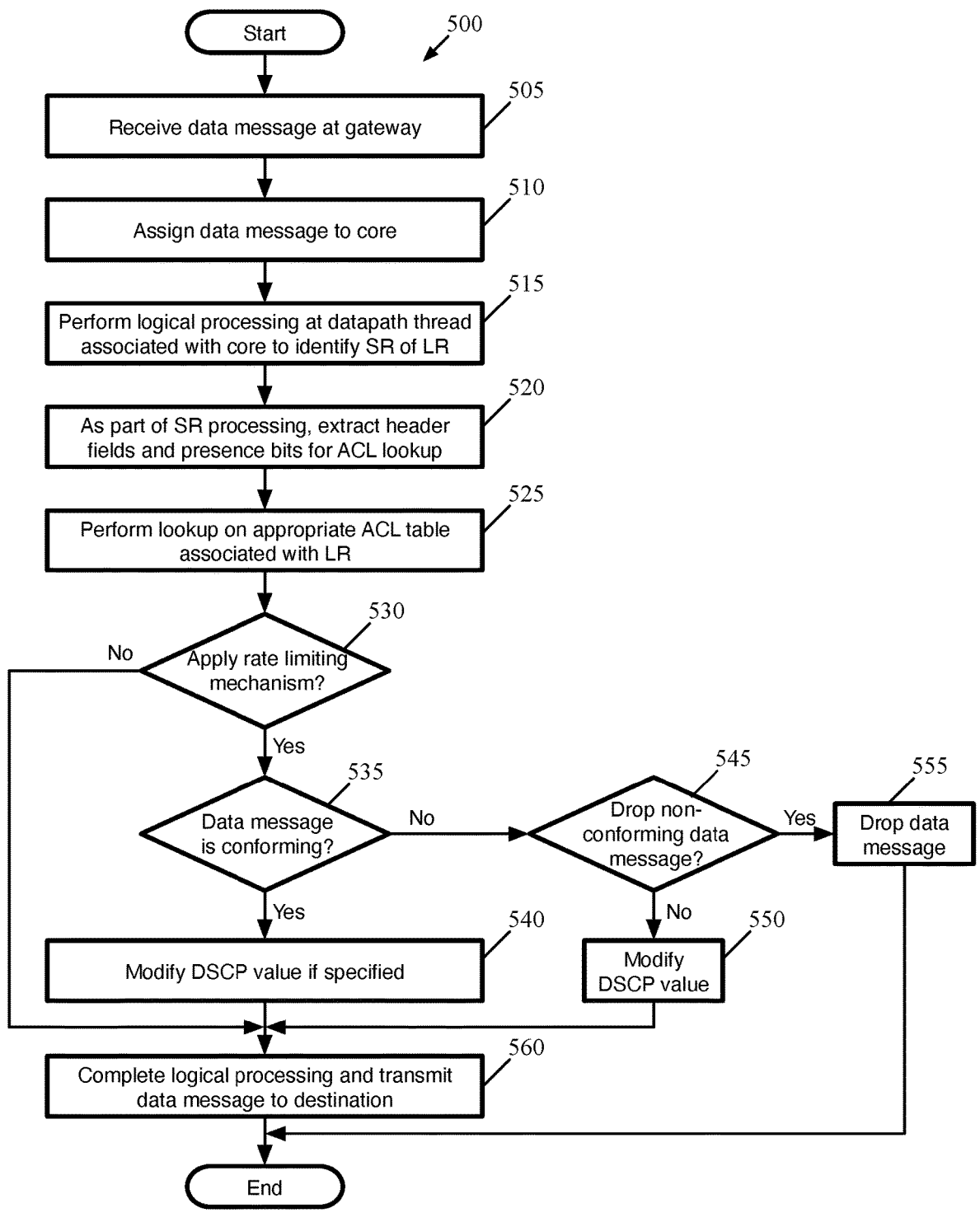
FIG. 5 conceptually illustrates a process of some embodiments for processing a data message at a gateway.

FIG. 5 conceptually illustrates a process 500 of some embodiments for processing a data message at a gateway. The process 500 is performed by the gateway datapath (e.g., the datapath daemon 300) in some embodiments upon receipt of a data message. Specifically, in some embodiments, much of the process (once a data message has been assigned to a core) is performed by one of the packet processing threads of the gateway datapath. The process 500 will be described in part by reference to FIGS. 6-8, which illustrate the generation of ACL match table keys for different data messages as well as an example ACL table.

As shown, the process 500 begins by receiving (at 505) a data message at the gateway. This data message may be an ingress data message (e.g., received from an external network) for which the gateway is the first hop for logical network processing or an egress data message (e.g., received from a host computer at which the source logical network endpoint for the data message operates) for which the gateway is not the first hop for logical network processing.

Next, the process 500 assigns (at 510) the data message to one of the cores of the gateway device. As mentioned, this operation may use a hash-based load balancing technique such as receive side scaling (RSS) that distributes data messages across the different cores. Such techniques may assign different data messages belonging to the same logical network (and thus that will be processed by the same logical router) to different cores (while consistently assigning data messages belonging to the same data flow to the same core).

Once the data message has been assigned to a core, in some embodiments the datapath thread for that core performs the remainder of the process 500. In some embodiments, the data message is assigned to a queue associated with that core, and thus there may be a short latency while earlier data messages in the queue are processed, before the process 500 continues for the data message.

As shown, the process 500 performs (at 515) logical processing to identify a centralized routing component of a logical router (e.g., a T1 logical router) as the next stage of the processing pipeline for the data message. This processing may involve one or more stages of processing depending on (i) the direction of the data message (ingress or egress) and (ii) the architecture of the logical network to which the data message belongs. For example, this logical processing might involve various logical switches, other logical routers (e.g., multiple components of a T0 logical router, a distributed routing component of the same T1 logical router), distributed firewall, NAT, and/or load balancing.

Next, the process 500 performs processing for the centralized routing component of the logical router as the next stage of the processing pipeline for the data message. As part of this processing, the process 500 extracts (at 520) header fields and presence bits for the appropriate ACL table lookup. As mentioned, the datapath performs a lookup into one of several ACL tables in some embodiments, with the gateway device storing separate tables for ingress and egress ACL and for different protocols with different address lengths (e.g., IPv4 and IPv6).

As mentioned, to perform a lookup in the ACL table to determine whether to apply a rate limiting mechanism to a data message, some embodiments extract a particular set of header field values from the data message and match this (fixed-length) particular set of header field values against the rules. FIG. 6 conceptually illustrates the extraction of such a set of header values into an ACL match key from a data message 600. As shown, the data message 600 includes a payload and a set of header fields that are populated with values. Not all of the header fields are shown here, with the figure only highlighting the values that are used for the ACL match key of some embodiments. In addition, it should be noted that the size of the various data message fields is not shown to scale. In this example, the datapath extracts the header field values of seven different fields from the data message 600 to generate the ACL match key 605. As shown here, in some embodiments these fields are (from the layer 2 VLAN header, if present) the class of service (CoS) field, (from the layer 3 header) the differentiated services code point (DSCP) field, the transport layer protocol field, and the source and destination network layer addresses, and (from the layer 4 header), the source and destination transport layer ports. Some embodiments extract the type of service (ToS) field value rather than the DSCP field value for data messages that use the ToS field rather than the DSCP field.

In some embodiments, the ACL match key 605 is a fixed-length buffer or other data structure. However, certain fields (e.g., the ToS, DSCP, and/or CoS fields) may not be present in some of the data messages. For instance, FIG. 7 illustrates a data message 700 that has all of the same layer 3 and layer 4 fields as the data message 600, but does not include a ToS field (e.g., because there is no VLAN header present). However, when generating the ACL match key 705, a value still needs to be filled in for this field so that the ACL match key 705 is the appropriate length, so some embodiments use a default value in the match key. As described below, an ACL rule might match on a value or range of values that includes this default value, but a data message that does not actually have the field should not necessarily match such a rule. Accordingly, when generating the ACL match key, the gateway datapath of some embodiments includes a presence bit for each header field that indicates whether the field is actually present in the data message. The use of these presence bits in the ACL match key and the ACL table rules ensures that an accidental match will not occur as a result of the default value.

After extracting the header fields, the process 500 performs (at 525) a lookup on the appropriate ACL table associated with the logical router using the extracted set of header fields. The appropriate ACL table, as noted above, is the ACL table with rules for the direction of the data message (ingress or egress) as well as for the correct network layer protocol (e.g., IPv4 or IPv6).

Figure 8:
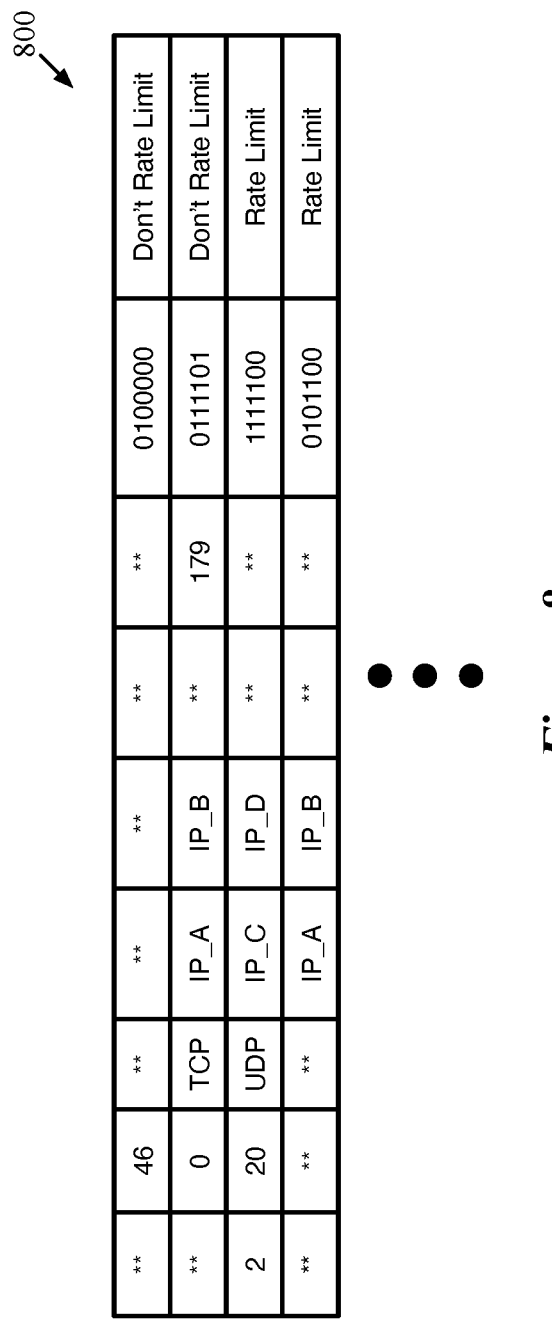
FIG. 8 conceptually illustrates an ACL table of some embodiments with several rules.

FIG. 8 conceptually illustrates an ACL table 800 of some embodiments with several rules. Each of these rules includes a set of match conditions as well as an action specifying whether or not data messages matching the rule are subject to rate limiting controls. The match conditions include, for each field (in this case, the same seven fields mentioned above), either a specific value, a range of values, or a wildcard (i.e., any value satisfies the rule, represented in the figure by "**"). In addition, the match conditions include a set of presence bits specifying whether each header field is required. When a specific header field is required for a rule (e.g., indicated by a "1" in the presence bit), only data messages that include that header field can match that rule. On the other hand, when a specific header field is not required for a rule (e.g., indicated by a "0" in the presence bit), data messages can match that rule irrespective of whether they include the specific header field. Typically, if a field is wildcarded in a rule, then the presence of the field is not required. Some embodiments, however, allow for rules such as the fourth rule shown in the ACL table 800, which requires data messages to carry a DSCP field in order to match the rule (the second presence bit is '1') but does not care what value is carried in that field. Other embodiments always set the presence bit for any wildcard field in the match conditions to '0'; in such embodiments, an administrator can require the presence of the field but any value in that field by matching on a range for the field that encompasses the entire possible range of values for the field.

The rules in the ACL table are arranged in priority order. A data message might satisfy the match conditions of more than one rule, but only the highest priority matched rule will govern whether or not the data message is subject to rate limiting controls. For instance, any data message between IP_A and IP_B (which could be specific individual addresses or ranges of addresses) with a destination TCP port of 179 and DSCP value of 0 satisfies the match conditions of both the second and fourth rules. However, a lookup for such a data message would match the higher-priority second rule, indicating that the data message is not subject to rate limiting controls. Other data messages between the same IP addresses but with different transport layer protocols, destination ports, and/or DSCP values would match the fourth rule, indicating that these data messages are subject to rate limiting controls.

Returning to FIG. 5, the process 500 determines (at 530) whether to apply a rate limiting mechanism to the data message (i.e., whether the data message is subject to rate limiting controls). As described, in some embodiments this is determined by the highest-priority matching rule in the relevant ACL table for the data message. In addition, some data messages might not match any of the ACL rules. Some embodiments subject such data messages to rate limiting controls, while in other embodiments these data messages are not subject to rate limiting controls (i.e., are automatically allowed without affecting the rate limiting). If the data message is not subject to rate limiting controls, the process 500 proceeds to 560, described below. This decision as to whether to apply rate limiting controls allows for certain traffic to always be passed through without being subject to rate controls. For instance, in some embodiments, control traffic such as routing protocol messages (e.g., BGP, OSPF messages), bidirectional forwarding protocol (BFD) messages, etc. should always be allowed.

If the data message is subject to rate limiting controls, the process 500 applies these controls to determine (at 535) whether the data message is conforming. In some embodiments, this rate limiting mechanism involves the application of a set of QoS data structures for the particular logical router, which is described in greater detail in U.S. patent application Ser. No. 16/741,457, which is incorporated herein by reference. The gateway datapath compares a size of the data message that is subject to rate limiting to a current token bucket value stored for the logical router. The QoS data structure for a logical router of some embodiments tracks the amount of data processed (in both ingress and egress directions) by each core of the gateway device for the logical router and subtracts these amounts from a token bucket value, in addition to regularly adding to the token bucket value a committed rate (based on an allowed bandwidth for the particular logical router). Additional details of the token bucket value computations are described in U.S. patent application Ser. No. 16/741,457. When a data message is smaller than the current token bucket value, the data message is conforming; when the data message is larger than the current token bucket value, the data message is not conforming.

If the data message is conforming, then this data message is allowed and the process 500 modifies (at 540) the DSCP value of the data message if such modification is specified by the rate limiting configuration, and proceeds to 560. In some embodiments, the administrator can configure the gateway datapath (e.g., as part of the logical router rate limiting configuration) to set conforming data messages to a DSCP value (typically a value indicating that the data message is high priority). This operation is not required in some embodiments, as the administrator can also choose to forego this DSCP marking and allow the data message without modification.

If the data message is not conforming, the process determines (at 545) whether to drop the non-conforming data message. Just as the logical network administrator can opt to modify the DSCP value of conforming data messages, some embodiments allow the administrator to configure the rate limiting mechanism to either drop non-conforming data messages or to modify the DSCP value of these data messages (typically to a value indicating that the data message is low priority). If the gateway datapath is configured to modify the data message, the process 500 modifies (at 550) the DSCP value of the data message and proceeds to 560. Otherwise, the process 500 drops (at 555) the data message and ends.

So long as the data message is not dropped, the process 500 completes (at 560) logical processing and transmits the data message to its destination. This includes the routing for the logical router as well as other logical processing stages, again depending on the direction of the data message (ingress or egress) and the architecture and configuration of the logical network. As at operation 515, these logical processing stages might include various logical switches, other logical routers (e.g., multiple components of a different logical router, a distributed routing component of the same logical router), distributed firewall, NAT, and/or load balancing. In addition, for ingress data messages, transmitting the data message often involves encapsulating the data message (e.g., using VXLAN, GENEVE, STT, or other encapsulation).

It should be noted that, in some embodiments, the entire set of processing stages (and thus the process 500) is typically only performed for the first data message of a data message flow. The gateway datapath generates a flow cache entry based on this processing, and subsequent data messages match the flow cache entry rather than requiring the more resource-intensive set of processing stages. To ensure that the ACL table does not need to be looked up for each subsequent data message in the data message flow, all of the fields on which the ACL table matches are also incorporated into the flow cache entry (e.g., the seven fields described above). In general, the protocol field, source and destination network addresses, and source and destination transport layer ports would be part of the flow cache, as these are the values often used to define a data message flow. DSCP (or ToS) and CoS fields are added to the flow cache entries when using the above-described ACL tables to determine whether to rate limit data messages.

In addition, some embodiments incorporate at least some of the presence bits into the flow cache entry. Some embodiments allocate one byte to store the presence bits (e.g., 7 bits). Other embodiments allocate one byte in the flow cache entry for the DSCP field (a 6-bit field) and one byte for the CoS field (a 3-bit field). As both of these fields are less than 8 bits, the allocated byte can also store a presence bit for the field indicating whether the field is required.

In addition, within the flow cache, a data message that carries a particular field may not be allowed to match an entry with a presence bit of '0' for that particular field (as opposed to in the ACL table, where the '0' presence bit indicates matching is allowed whether or not the field is present). This forces a data message that carries the particular field to be processed through the full set of processing stages, including the ACL table, as the data message might actually match a higher priority rule that requires the presence of the field. If the data message that carries the particular field does match the rule with the presence bit of '0' for the particular field as the highest-priority rule when processed through the set of stages, some embodiments generate a new cache entry with this presence bit set to '1'. That is, the presence bit in the cache entry matches the data message for which the cache entry was generated rather than the ACL rule that was matched. Thus, for example, two data flows that match all of the same rules during processing and otherwise have all of the same relevant header field values, but only one of which carries a specific field (e.g., the CoS field), will be represented with two different entries in the cache in some such embodiments.

While the lookups to determine whether subsequent data messages of a flow are subject to rate limiting controls are handled by the flow cache entry, the actual application of the rate limiting mechanism is applied separately for each data message in the flow. Thus, for instance, a first data message in a flow might be allowed, but a later data message in the same flow could be dropped due to congestion (i.e., because the current token bucket value is smaller when the later data message is received).

FIG. 9 conceptually illustrates an electronic system 900 with which some embodiments of the invention are implemented. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random-access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of processing data messages on a gateway device that executes a gateway datapath that implements a logical router for a logical network that processes traffic between the logical network and an external network, the method comprising:
at a processing stage of the logical router that processes the data message:
using an access control list (ACL) table to determine whether the data message is subject to rate limiting controls defined for the logical router based at least on an ACL match key, the ACL match key comprising (i) a set of header field values and (ii) a set of bits indicating whether each of the header field values is present in the data message;
in response to the data message being subject to rate limiting controls, determining whether to allow the data message according to a rate limiting mechanism for the logical router.

2. The method of claim 1, wherein the gateway device stores, for the logical router, (i) a first ACL table for data traffic entering the logical network and (ii) a second ACL table for data traffic exiting the logical network, wherein the ACL table used to determine whether the data message is subject to rate limiting controls is one of the first and second ACL tables.

3. The method of claim 1, wherein:
the gateway device operates in a datacenter,
logical network is a logical network of a particular tenant of the datacenter;
the particular logical router is a logical router of the particular tenant logical network; and
the gateway device stores ACL tables for logical routers of a plurality of logical networks for a plurality of tenants of the datacenter.

4. The method of claim 1, wherein using the ACL table to determine whether the data message is subject to rate limiting controls defined for the logical router comprises:
extracting the set of header field values from the data message; and
matching the extracted set of header field values against a plurality of rules in the ACL table.

5. The method of claim 4, wherein the set of header field values comprises a protocol field indicating a transport layer protocol of the data message, source and destination network addresses, source and destination transport layer ports, a differentiated services code point (DSCP) value, and a class of service (CoS) value.

6. The method of claim 4, wherein the set of header field values comprises a protocol field indicating a transport layer protocol of the data message, source and destination network addresses, source and destination transport layer ports, a type of service (ToS) value, and a CoS value.

7. The method of claim 4, wherein:
extracting the set of header field values comprises generating the ACL match key; and
matching the extracted set of header field values against the plurality of rules comprises matching the ACL match key.

8. The method of claim 7, wherein the ACL match key is a fixed length buffer such that when a particular header field is not present in the data message, generating the ACL match key comprises:
using a default value for the header field value corresponding to the particular header field in the ACL match key; and
setting a particular bit corresponding to the particular header field in the set of bits of the ACL match key to indicate that the particular header field is not present in the data message, wherein when the particular header field is not present, the data message only matches rules in the ACL table that do not require presence of the particular header field.

9. The method of claim 4, wherein when no rule is found in the plurality of rules that matches the extracted set of header fields, the data message is not subject to rate limiting controls and the rate limiting mechanism is not applied to the data message.

10. The method of claim 4 wherein when the extracted set of header fields matches a particular rule in the ACL table, the particular rule specifies whether the data message is subject to rate limiting controls.

11. The method of claim 4, wherein:
the plurality of rules in the ACL table are arranged in a priority order; and
when the extracted set of header fields matches multiple rules in the ACL table, the matched rule with the highest priority is applied to the data message.

12. The method of claim 1, wherein:
the gateway device stores, for the logical router, (i) a first ACL table for data traffic with Internet Protocol version 4 (IPv4) network addresses and (ii) a second ACL table for data traffic with IP version 6 (IPv6) network addresses;
IPv4 and IPv6 network addresses have different lengths; and
each of the ACL tables uses a respective fixed length buffer generated from fields of data messages for matching operations.

13. The method of claim 1 further comprising generating a flow cache entry based on the executed set of processing stages, the flow cache entry used to process subsequent data messages belonging to a same data flow as the data message without executing the set of processing stages for the subsequent data messages.

14. The method of claim 13, wherein:
the flow cache entry matches on at least all data message fields used by the ACL table so that additional use of the ACL table is not required for the subsequent data messages; and
when the data message is subject to the rate limiting controls, the subsequent data messages are also subject to the rate limiting controls.

15. The method of claim 14, wherein the data message is allowed by the rate limiting mechanism and a particular subsequent data message belonging to the data flow is not allowed by the rate limiting mechanism.

16. The method of claim 1, wherein:
a QoS data structure associated with the logical router specifies a current amount of data that can be processed for the logical router; and
determining whether to allow the data message comprises comparing a size of the data message to the current amount of data specified by the QoS data structure.

17. The method of claim 16, wherein determining whether to allow the data message further comprises allowing the data message when the size of the data message is less than the current amount of data specified by the QoS data structure.

18. The method of claim 17, wherein allowing the data message comprises setting a DSCP value for the data message to a particular value indicating that the data message is a high priority data message.

19. The method of claim 16, wherein determining whether to allow the data message further comprises dropping the data message when the size of the data message is greater than the current amount of data specified by the QoS data structure.

20. The method of claim 16, wherein determining whether to allow the data message further comprises, when the size of the data message is greater than the current amount of data specified by the QoS data structure, setting a DSCP value for the data message to a particular value indicating that the data message is a low priority data message.

* * * * *